United States Patent

Cha

(10) Patent No.: US 8,970,605 B2
(45) Date of Patent: Mar. 3, 2015

(54) DISPLAY DRIVER WITH IMPROVED POWER CONSUMPTION AND OPERATION METHOD OF IMPROVING POWER CONSUMPTION OF IMAGE DATA PROCESSING DEVICE

(75) Inventor: Chi Ho Cha, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 372 days.

(21) Appl. No.: 13/451,769

(22) Filed: Apr. 20, 2012

(65) Prior Publication Data

US 2013/0100121 A1 Apr. 25, 2013

(30) Foreign Application Priority Data

Oct. 20, 2011 (KR) .................. 10-2011-0107506

(51) Int. Cl.
*G06F 15/16* (2006.01)
*H04N 19/423* (2014.01)
*H04N 13/00* (2006.01)
*H04N 13/04* (2006.01)
*H04N 19/597* (2014.01)
*G09G 3/00* (2006.01)
*G09G 3/20* (2006.01)
*G09G 5/393* (2006.01)
*G09G 5/395* (2006.01)

(52) U.S. Cl.
CPC ..... *H04N 19/00484* (2013.01); *H04N 13/0048* (2013.01); *H04N 13/0055* (2013.01); *H04N 13/0059* (2013.01); *H04N 13/0409* (2013.01); *H04N 19/00769* (2013.01); *G09G 3/003* (2013.01); *G09G 3/20* (2013.01); *G09G 5/393* (2013.01); *G09G 5/395* (2013.01); *G09G 2310/0272* (2013.01); *G09G 2340/02* (2013.01)
USPC .......................................... 345/502

(58) Field of Classification Search
CPC .............. H04N 13/0055; G09G 5/395; G09G 2310/0275; G09G 2340/02
USPC .......................................... 345/502
See application file for complete search history.

(56) References Cited

U.S. PATENT DOCUMENTS

2012/0300843 A1* 11/2012 Horlander et al. ....... 375/240.12
2013/0322544 A1* 12/2013 Horlander ................ 375/240.16

FOREIGN PATENT DOCUMENTS

| JP | 2010171522 A | 8/2010 |
|---|---|---|
| KR | 20060036953 A | 5/2006 |
| KR | 100702742 B1 | 12/2006 |
| KR | 100748946 B1 | 3/2007 |
| KR | 100704938 B1 | 4/2007 |
| KR | 20070097639 A | 10/2007 |

* cited by examiner

*Primary Examiner* — Mark Zimmerman
*Assistant Examiner* — Vu Nguyen
(74) *Attorney, Agent, or Firm* — Harness, Dickey & Pierce, P.L.C.

(57) ABSTRACT

A display driver is provided. The display driver includes a compressor outputting first data by compressing input data, a first selection circuit transmitting the input data or the first data to a memory in response to a first selection signal, a de-compressor outputting third data by de-compressing second data output from the memory, and a display interface for transmitting fourth data generated by processing the third data to a display.

8 Claims, 16 Drawing Sheets

DISPLAY DRIVER WITH IMPROVED POWER CONSUMPTION AND OPERATION METHOD OF IMPROVING POWER CONSUMPTION OF IMAGE DATA PROCESSING DEVICE

CROSS-REFERENCE TO RELATED APPLICATION

This application claims priority under 35 U.S.C. §119 to Korean Patent Application No. 10-2011-0107506 filed on Oct. 20, 2011 in the Korean Intellectual Property Office (KIPO), the entire contents of which are incorporated herein by reference.

BACKGROUND

Example embodiments relate to an image data processing scheme, and more particularly, to a display driver, which may reduce power consumption, and/or a method for operating an image data processing device.

As the display resolution of portable devices such as smart phones and tablet personal computers (PCs) increases, a memory bandwidth requirement is increased.

A large amount of image data is transmitted from an application processor to a display driver. That is, as display resolution increases, power consumed in the application processor and the display driver, which are included in the portable device, increases.

In addition, a user may want to display stereoscopic 3D image data by using a display of a portable device. The stereoscopic 3D image data has right and left image data alternately arranged vertically line by line, which may create cross-talk in the stereoscopic 3D image data.

SUMMARY

According to some example embodiments, there is provided a display driver, including a compressor configured to compress input data and configured to output first data, a first selection circuit configured to transmit the input data or the first data to a memory in response to a first selection signal, a de-compressor configured to output second data by de-compressing third data output from the memory, and a display interface configured to process the second data and create fourth data for transmitting to a display.

The display driver may include a control logic circuit configured to generate the first selection signal based on information indicating whether to compress the input data.

The display driver may further include a pin configured to receive the first selection signal.

The display driver may further include a second selection circuit configured to transmit the input data or the third data to the de-compressor based on a second selection signal.

The display driver may further include a control logic circuit configured to generate the first selection signal and the second selection signal based on the input data.

The display driver may further include a first pin configured to receive the first selection signal and a second pin configured to receive the second selection signal.

The display driver may further include a second selection circuit configured to transmit the input data or the third data to the de-compressor based on a second selection signal, and a third selection circuit configured to transmit the input data or the second data to the display interface based on a third selection signal.

The display driver may further include a control logic circuit configured to generate the first selection signal, the second selection signal and the third selection signal based on the input data.

The display driver may further include a first pin configured to receive the first selection signal, a second pin configured to receive the second selection signal and a third pin configured to receive the third selection signal.

The display driver may further include a second selection circuit configured to transmit the input data or the second data to the display interface based on a second selection signal.

If the input data are stereoscopic 3D image data in which right and left pixel data are alternately arranged vertically line by line, the compressor may generate the first data by re-arranging the stereoscopic 3D image data and compressing re-arranged stereoscopic 3D image data.

The re-arranged stereoscopic 3D image data may include a left frame and a right frame, the left frame including only left pixel data and the right frame including only right pixel data and being arranged adjacent to the left frame.

If the third data are compressed stereoscopic 3D image data, and the de-compressor rearranges the de-compressed stereoscopic 3D image data to generate and output the second data, the de-compressed stereoscopic 3D image data may include a left frame and a right frame. The left frame may include only left pixel data and the right frame may include only right pixel data and may be arranged adjacent to the left frame. The second data may be stereoscopic 3D image data where right and left pixel data are alternately arranged vertically line by line.

At least one example embodiment is directed to method for operating an image data processing device. The method may include receiving and rearranging stereoscopic 3D image data in which right and left pixel data are alternately arranged vertically line by line. The method may further include generating compressed stereoscopic 3D image data by compressing re-arranged stereoscopic 3D image data. The re-arranged stereoscopic 3D image data may include a left frame and a right frame. The left frame may include only left pixel data and the right frame may include only right pixel data and may be arranged adjacent to the left frame.

The image data processing device may be an application processor or a display driver.

The method may further include generating de-compressed stereoscopic 3D image data by de-compressing the compressed stereoscopic 3D image data. The method may further include outputting restored stereoscopic 3D image data where right and left pixel data are alternately arranged vertically line by line.

According to some example embodiments, there is provided an image processing device. The image processing device may include an image processing circuit and a compressor. The compressor may be configured to receive stereoscopic input data from the image processing circuit and to arrange the stereoscopic image data such that a left frame of the arranged stereoscopic image data includes only left pixel data of the received stereoscopic input data and a right frame of the arranged stereoscopic image data includes only right pixel data of the received stereoscopic input data. The image processing device may further include a transmission interface configured to transmit data output by the compressor.

The compressor may further be configured to compress the arranged stereoscopic image data for transmission by the transmission interface.

The compressor may further be configured to insert control information into the arranged stereoscopic image data for transmission by the transmission device.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF THE PREFERRED EMBODIMENTS

Figure 1:
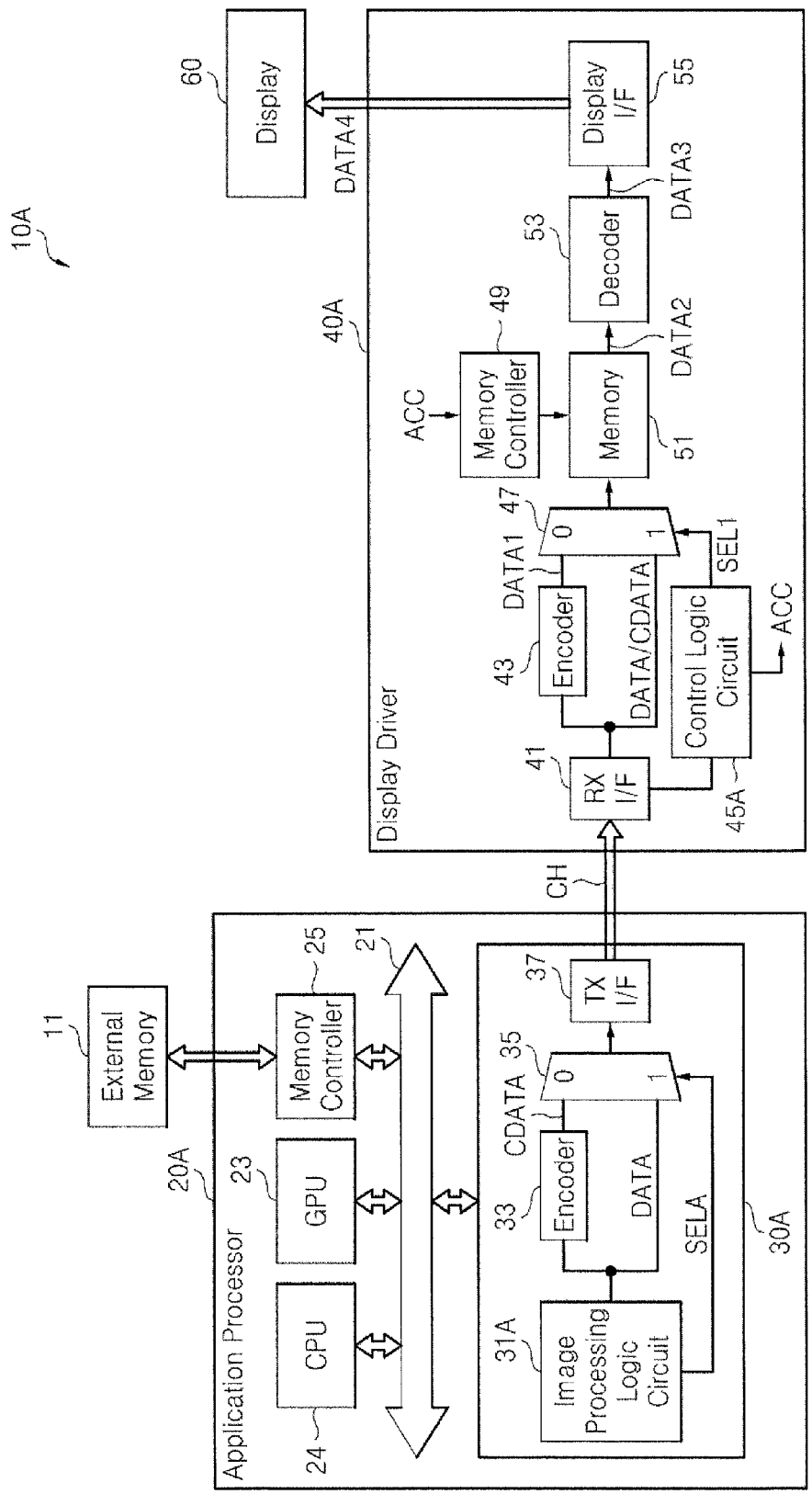
FIG. 1 is a block diagram of an image data processing system according to at least one example embodiment.

Example embodiments now will be described more fully hereinafter with reference to the accompanying drawings, in which example embodiments are shown. Example embodiments may, however, be embodied in many different forms and should not be construed as limited to the example embodiments set forth herein. Rather, example embodiments are provided so that this disclosure will be thorough and complete, and will fully convey the scope of example embodiments to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image data processing system according to at least one example embodiment. Referring to FIG. 1, the image data processing system 10A includes an external memory 11, a first image data processing device, e.g., an application processor 20A, a second image data processing device, e.g., a display driver 40A, and a display 60.

An image data processing system (10A to 10H: collectively 10), which will be explained referring to FIGS. 1 to 8, may be used for a television (TV), a digital TV (DTV), an internet protocol television (IPTV), a computer or a portable device.

The portable device may be a device including a 2-dimensional (D) display 60 or a 3-D display 60, and may be, for example, a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PDN), a handheld game console or an e-book.

The external memory 11 may be a volatile memory for example, a dynamic random access memory (DRAM). Moreover, the external memory 11 may be a non-volatile memory such as, for example, a flash memory, a resistive random access memory (RRAM) or a phase change random access memory (PRAM).

The application processor 20A may control an operation of a display driver 40A and may transmit data, e.g., image data, 3D image data or stereoscopic 3D image data, to the display driver 40A.

The application processor 20A may transmit compressed image data (CDATA) or uncompressed image data (DATA) to the display driver 40A through a channel CH.

The application processor 20A may include a graphics processing unit (GPU) 23, a memory controller 25 and a display controller 30A that may communicate with each other through a bus 21.

The GPU 23 controls an operation of the application processor 20A. For example, the GPU 23 may control a memory controller 25 and a display controller 30A. According to example embodiments, the application processor 20A may further include a central processing unit (CPU) 24 controlling an operation of the GPU 23. Here, the CPU 24 may control an operation of the application processor 20A overall, and control the memory controller 25 and the display controller 30A.

The memory controller 25 may transmit image data, e.g., moving image data or still image data, output from the external memory 11 to the display controller 30A through the bus 21.

The display controller 30A may transmit compressed, or encoded, image data CDATA or uncompressed, or raw, image data DATA to the display driver 40A through a communication channel CH. For example, the display controller 30A, in addition to image data DATA or CDATA, may transmit at least one control signal, e.g., a clock signal, a synchronization signal or a signal related to the synchronization signal, which the display driver 40A may use to process the image data DATA or CDATA sent to the display driver 40A.

The display controller 30A includes an image processing logic circuit 31A, a compressor 33, a selection circuit 35 and a transmission interface 37.

According to a control signal of the GPU 23 or the CPU 24, the image processing logic circuit 31A may process image data transmitted from the memory controller 25 and output processed image data. In addition, the image processing logic circuit 31A may determine whether the image data needs compression and generate a selection signal SELA according to a determination result.

The compressor 33 may compress image data DATA output from the image processing logic circuit 31A at predetermined compression ratio and output compressed image data CDATA. For example, the compressor 33 may be an encoder. The compressor 33 may be controlled by the image processing logic circuit 31A.

The selection circuit 35 may transmit image data CDATA compressed by the compressor 33 or image data DATA output from the image processing logic circuit 31A, i.e., uncompressed image data, to a transmission interface 37 in response to a selection signal SELA. For example, the selection circuit 35 may be a multiplexer.

For example, the application processor 20A may compress image data to reduce the amount of image data transmitted to the display driver 40A through a channel CH and/or to reduce the power consumed in each image data processing device 20A or 40A. A method of compressing stereoscopic 3D image data is to be explained in detail referring to FIGS. 11 and 12.

The transmission interface 37 may be, for example, a CPU interface, an RGB interface or a serial interface. According to example embodiments, the transmission interface 37 may be, for example, a mobile display digital interface (MDDI), a mobile industry processor interface (MIPI®), a serial peripheral interface (SPI), an inter IC (I²C) interface, an interface supporting a display port (DP), an interface supporting an embedded display port (eDP) or a high-definition multimedia interface (HDMI).

The display driver 40A may receive image data CDATA compressed by the application processor 20A and store it in the memory 51, de-compress image data DATA2 output from the memory 51, process de-compressed image data DATA2 and transmit processed image data DATA4 to a display 60.

In addition, the display driver 40A may compress uncompressed image data DATA output from the application processor 20A by using the compressor 43, store compressed image data in the memory 51, de-compress image data output from the memory 51 and transmit de-compressed image to the display 60.

The display driver 40A includes a receiving interface 41, a compressor 43, a control logic circuit 45A, a first selection circuit 47, a memory controller 49, a memory 51, a de-compressor 53 and a display interface 55.

The receiving interface 41 may be the same interface as the transmission interface 37. The compressor 43 may compress image data output from the receiving interface 41, e.g., uncompressed image data DATA, and output compressed image data DATA1. For example, the compressor 43 which may be embodied in an encoder may be controlled by the control logic circuit 45A.

The control logic circuit 45A may generate a first selection signal SEL1 and an access control signal ACC according to control information included in image data DATA or CDATA output from the receiving interface 41.

For example, when uncompressed image data DATA are output from the receiving interface 41, the control logic circuit 45A may output a control signal for enabling the compressor 43 and a first selection signal SEL1 having a first level, e.g., logic 0 or a low level, according to the control information. However, when compressed image data DATA are output from the receiving interface 41, the control logic circuit 45A may output a control signal for disabling the compressor 43 and a first selection signal SEL1 having a second level, e.g., logic 1 or a high level, according to the control information.

According to a level of the first selection signal SEL1, the first selection circuit 47 may transmit compressed image data CDATA to the memory 51 or transmit image data DATA1 compressed by the compressor 43 to the memory 51. For example, when the first selection signal SEL1 is at a first level, the first selection circuit 47 may transmit data DATA1 compressed by the compressor 43 to the memory 51. When the first selection signal SEL1 is at a second level, the first selection circuit 47 may transmit compressed data CDATA to the memory 51.

The memory controller 49 may control an access operation on the memory 51, e.g., a write operation writing image data CDATA or DATA 1 to the memory 51 and a read operation reading image data DATA2 from the memory 51, according to an access control signal ACC.

The memory 51 may store or output image data CDATA or DATA1 output from the first selection circuit 47 according to a control of the memory controller 49. For example, the memory 51 may be, for example a frame memory or frame buffer. Accordingly, although resolution of the display 60 increases, a size of the frame memory 51 of the display driver 40A, which may process compressed image data CDATA or DATA1, may be decreased.

The de-compressor 53 may receive and de-compress image data DATA2 output from the memory 51, and output de-compressed image data DATA3. For example, the de-compressor 53, which may be a decoder, may be controlled by the control logic circuit 45A.

The display interface 55 may process image data DATA3 output from the de-compressor 53 and transmit processed image data DATA4 to the display 60. For example, a display interface 55 may convert image data DATA3, which is a digital signal, into an image signal DATA4 which is an analog signal.

The display 60 may display image corresponding to the image signal DATA4 output from the display driver 40A. The display 60 may display a 2-D image or a stereoscopic 3D image. The display 60 may be, for example, a thin film transistor-liquid crystal display (FTF-LCD), a light emitting diode (LED) display, an organic LED (OLED) display or an active-matrix OLEC (AMOLED) display.

Figure 2:
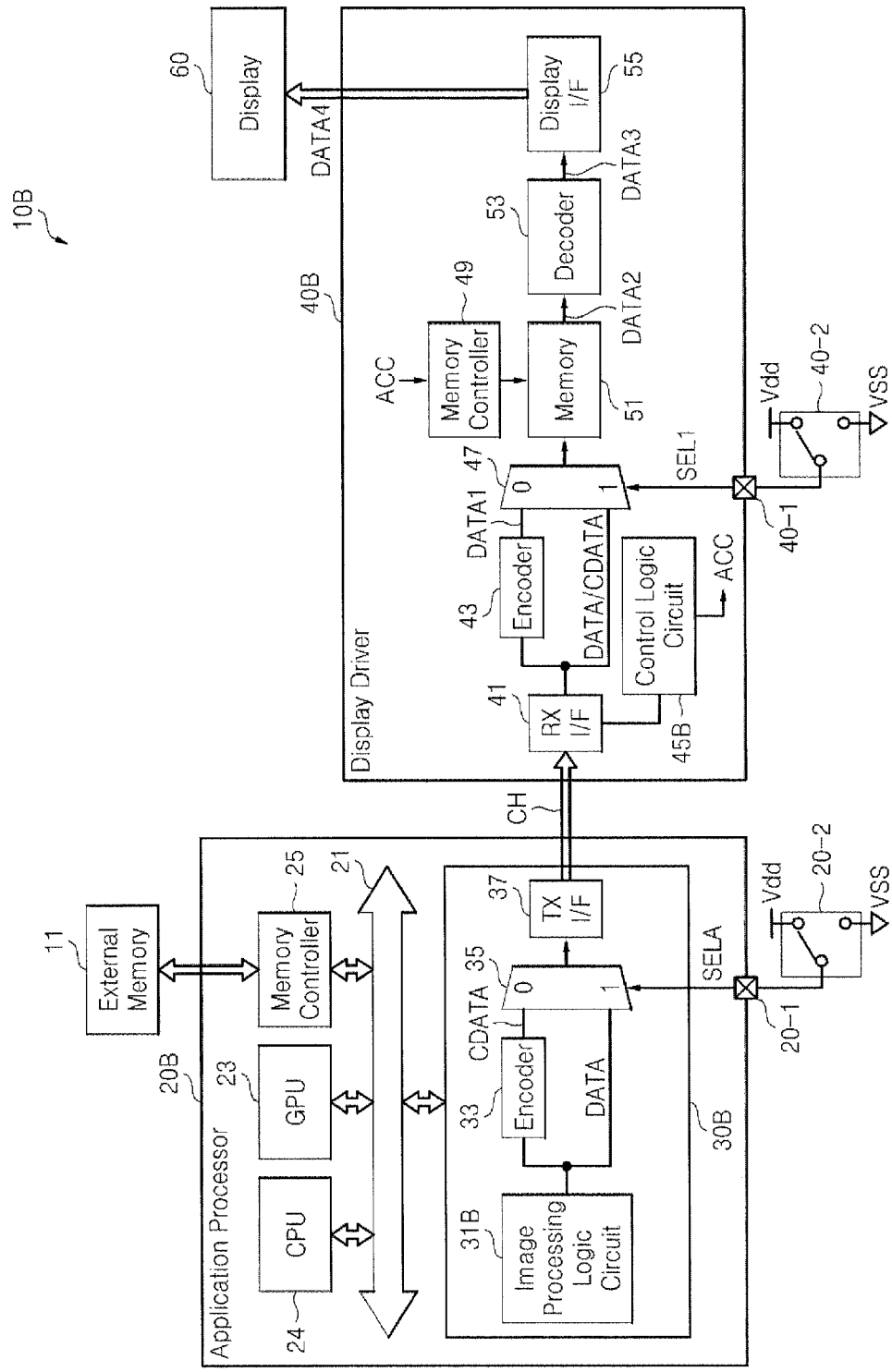
FIGS. 2-8 are block diagrams of the image data processing system according to example embodiments.

FIG. 2 is a block diagram of the image data processing system according to example embodiments. Referring to FIG. 2, the image data processing system 10B includes the external memory 11, a first image data processing device, e.g., an application processor 20B, a second image data processing device e.g., a display driver 40B, and the display 60.

Referring to FIGS. 1 and 2, the application processor 20B includes an external pin 20-1 for receiving a selection signal SELA for controlling an operation of the selection circuit 35. For example, when the external pin 20-1 is connected to a power supply line supplying power or supply voltage Vdd through a switch 20-2, the selection signal SELA is set to a second level. When the external pin 20-1 is connected to ground VSS through the switch 20-2, the selection signal SELA is set to a first level.

Accordingly, the selection circuit 35 outputs image data CDATA compressed by the compressor 33 according to a selection signal SELA having a first level and outputs image data DATA output from an image processing logic circuit 31B according to a selection signal SELA having a second level.

The display driver 40B includes a first external pin 40-1 for receiving a first selection signal SEL1 for controlling an operation of the first selection circuit 47. That is, the control logic circuit 45A of FIG. 1 outputs a first selection SEL1 and an access control signal ACC automatically according to control information. On the other hand, the control logic circuit 45B of FIG. 2 outputs an access control signal ACC according to control information and does not output a first selection SEL1.

For example, when the first external pin 40-1 is connected to a power supply line supplying power or supply voltage Vdd through the first switch 40-2, a first selection signal SEL1 is set to a second level. When the first external pin 40-1 is connected to ground VSS through the first switch 40-2, the first selection signal SEL1 is set to a first level. Accordingly, the first selection circuit 47 outputs image data DATA1 compressed by the compressor 43 according to a first selection signal SEL1 having a first level, and the first selection circuit 47 outputs image data DATA or CDATA output from the receiving interface 41 according to a first selection signal SEL1 having a second level.

Figure 3:
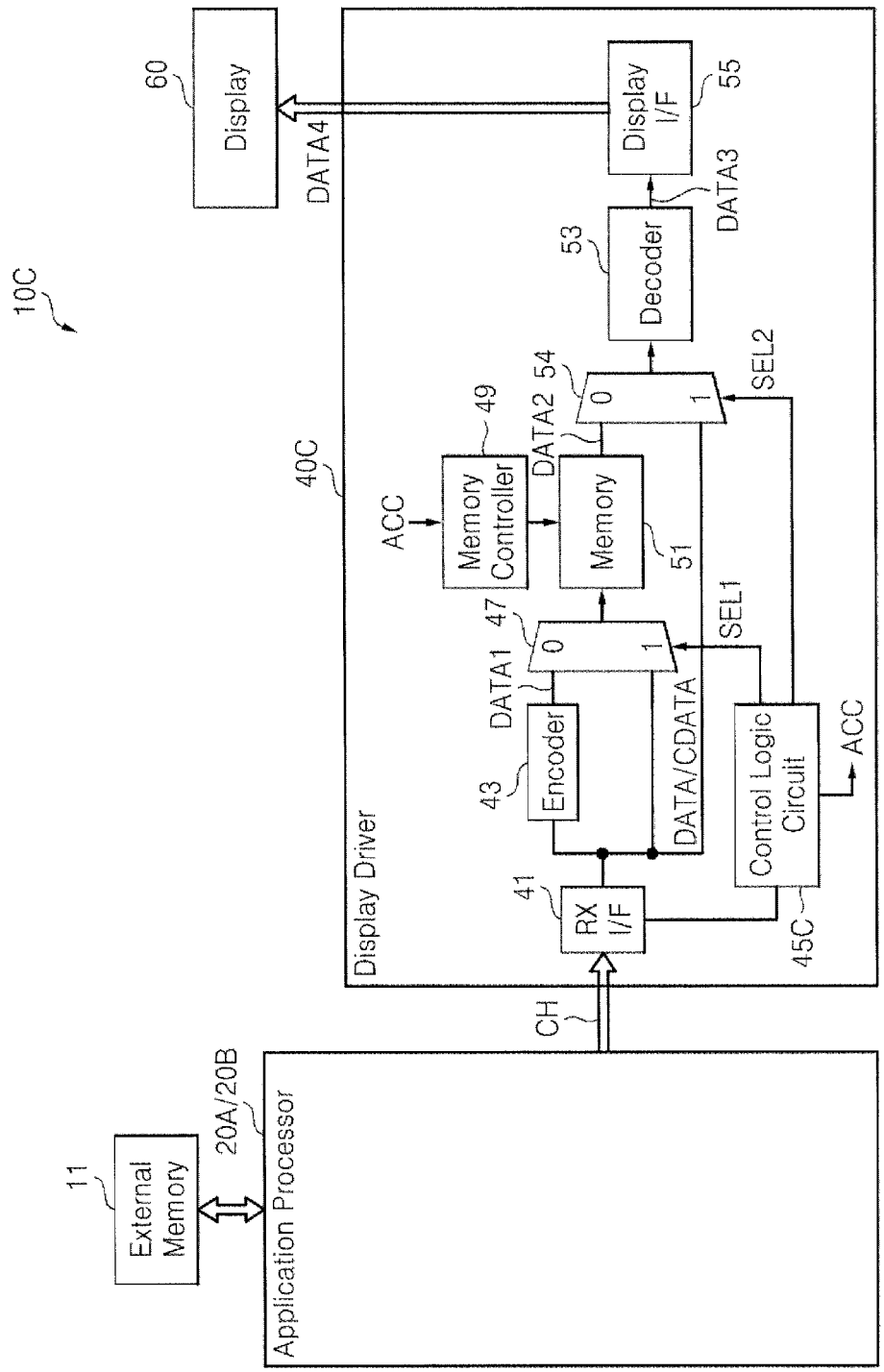

FIG. 3 is a block diagram of the image data processing system according to example embodiments. An image data processing system 10C includes an external memory 11, the application processor 20A or 20B, a display driver 40C and the display 60.

Except for a control logic circuit 45C and a second selection circuit 54, the display driver 40A of FIG. 1 has substantially the same structure as a display driver 40C of FIG. 3.

The control logic circuit 45C generates a first selection signal SEL1, a second selection signal SEL2 and an access control signal ACC according to control information included in image data CDATA or DATA.

According to a second selection signal SEL2, the second selection circuit 54 may transmit image data DATA2 output from the memory 51 or data DATA or CDATA output from the receiving interface 41 to the de-compressor 53. For example, the second selection circuit 54 outputs image data output from the memory 51 according to a second selection signal SEL2 having a first level and the second selection circuit 54 outputs image data DATA or CDATA output from the receiving interface 41 according to a second selection signal SEL2 having a second level.

For example, when the control logic circuit 45C outputs a first selection signal SEL1 having a second level and a second selection signal SEL2 having a first level according to the control information, compressed image data CDATA may be transmitted to the de-compressor 53 through the memory 51.

In addition, when the control logic circuit 45C outputs a first selection signal SEL1 having a first level and a second selection signal SEL2 having a second level and outputs a control signal that may disable the compressor 43, compressed image data CDATA may bypass the memory 51 and be transmitted to the de-compressor 53. When the control logic circuit 45C outputs a first selection signal SEL1 having a first level and a second selection signal having a first level and outputs a control signal that may enable the compressor 43, uncompressed image data DATA may be transmitted to the de-compressor 53 through the first selection circuit 47, the memory 51 and the second selection circuit 54 after being compressed by the compressor 43.

Figure 4:
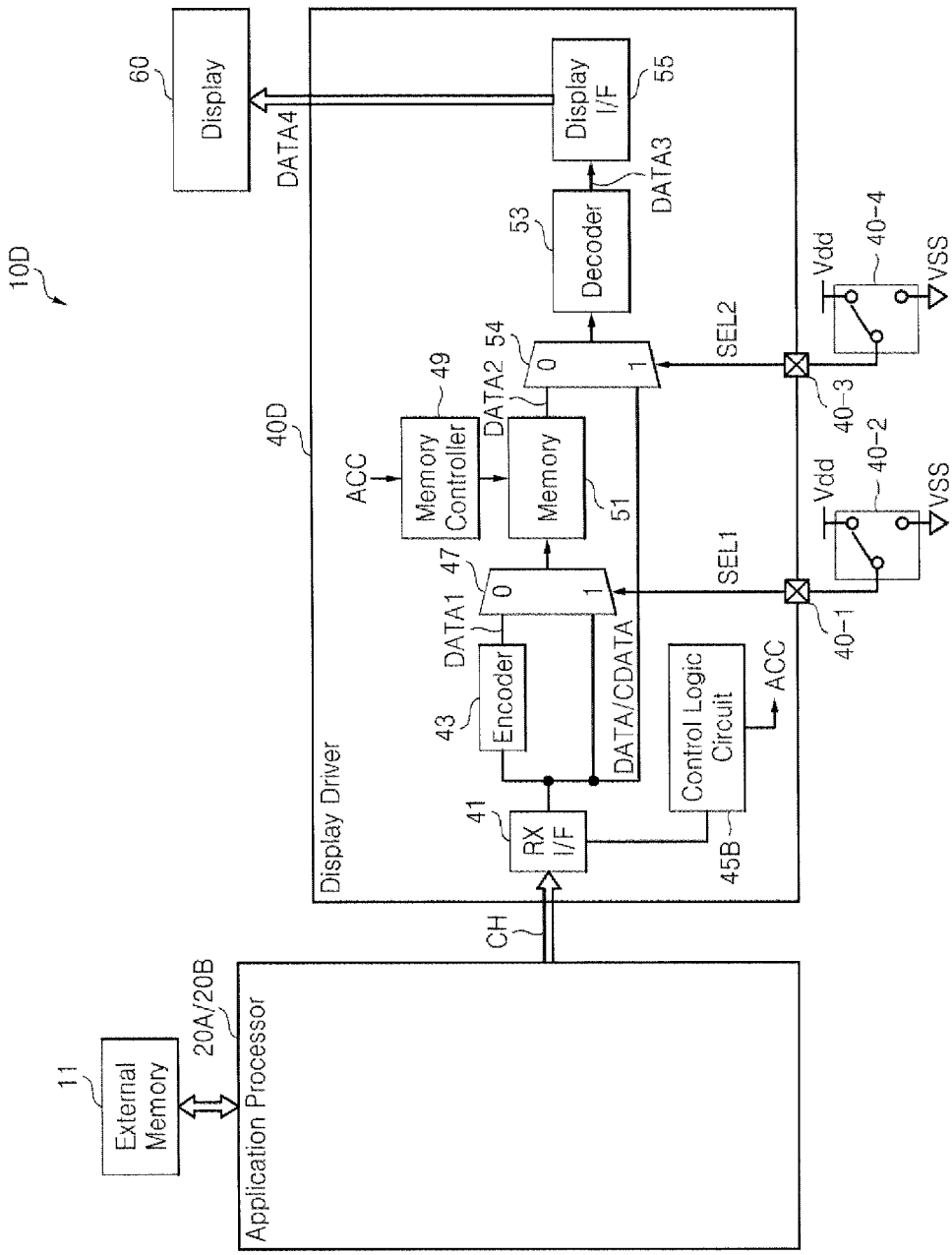

FIG. 4 is a block diagram of the image data processing system according to example embodiments. An image data processing system 10D includes the external memory 11, the application processor 20A or 20B, the display driver 40D and the display 60.

Except for a second external pin 40-3 and the second selection circuit 54, the display driver 40B of FIG. 2 has substantially the same structure as the display driver 40D of FIG. 4.

When a second external pin 40-3 is connected to a power supply line supplying power Vdd through a second switch 40-4, a second selection signal SEL2 is set to a second level. When the second external pin 40-3 is connected to ground VSS through the second switch 40-4, the second selection signal SEL2 is set to a first level. Accordingly, the second selection circuit 54 outputs image data DATA2 output from the memory 51 according to a second selection signal SEL2 having a first level, and the second selection circuit 54 outputs image data DATA or CDATA output from the receiving interface 41 according to a second selection signal SEL1 having a second level.

Figure 5:
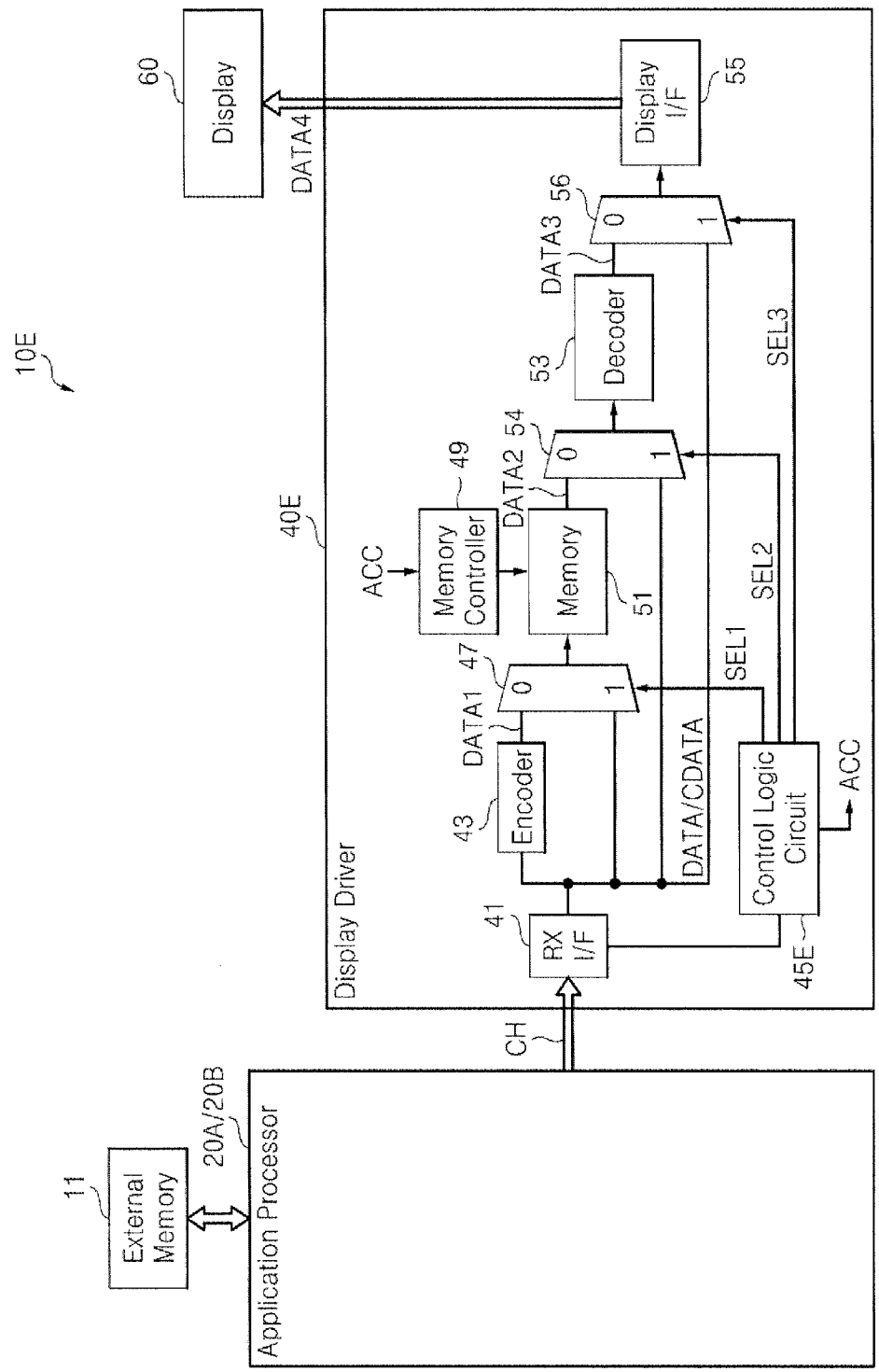

FIG. 5 is a block diagram of the image data processing system according to example embodiments. An image data processing system 10E includes the external memory 11, the application processor 20A or 20B, a display driver 40E and the display 60.

Except for a control logic circuit 45E and a third selection circuit 56, the display driver 40C of FIG. 3 has substantially the same structure as a display driver 40E of FIG. 5. The control logic circuit 45E generates a first selection signal SEL1, a second selection signal SEL2, a third selection signal SEL3 and an access control signal ACC according to control information included in data DATA or CDATA output from the receiving interface 41.

According to a third selection signal SEL3, the third selection circuit 56 may transmit image data DATA3 output from the de-compressor 53 or image data CDATA output from the receiving interface 41 to the display interface 55. For example, the third selection circuit 56 outputs image data DATA3 output from the de-compressor 53 according to a third selection signal SEL3 having a first level and the third selection circuit 56 outputs image data DATA or CDATA output from the receiving interface 41 according to a third selection signal SEL3 having a second level.

According to a level of each selection signal SEL1, SEL2 or SEL3 output from the control logic circuit 45E, uncompressed image data DATA output from the receiving interface 41 may be transmitted from the receiving interface 41 to the display interface 55 without intermediate transformation or storage.

Figure 6:
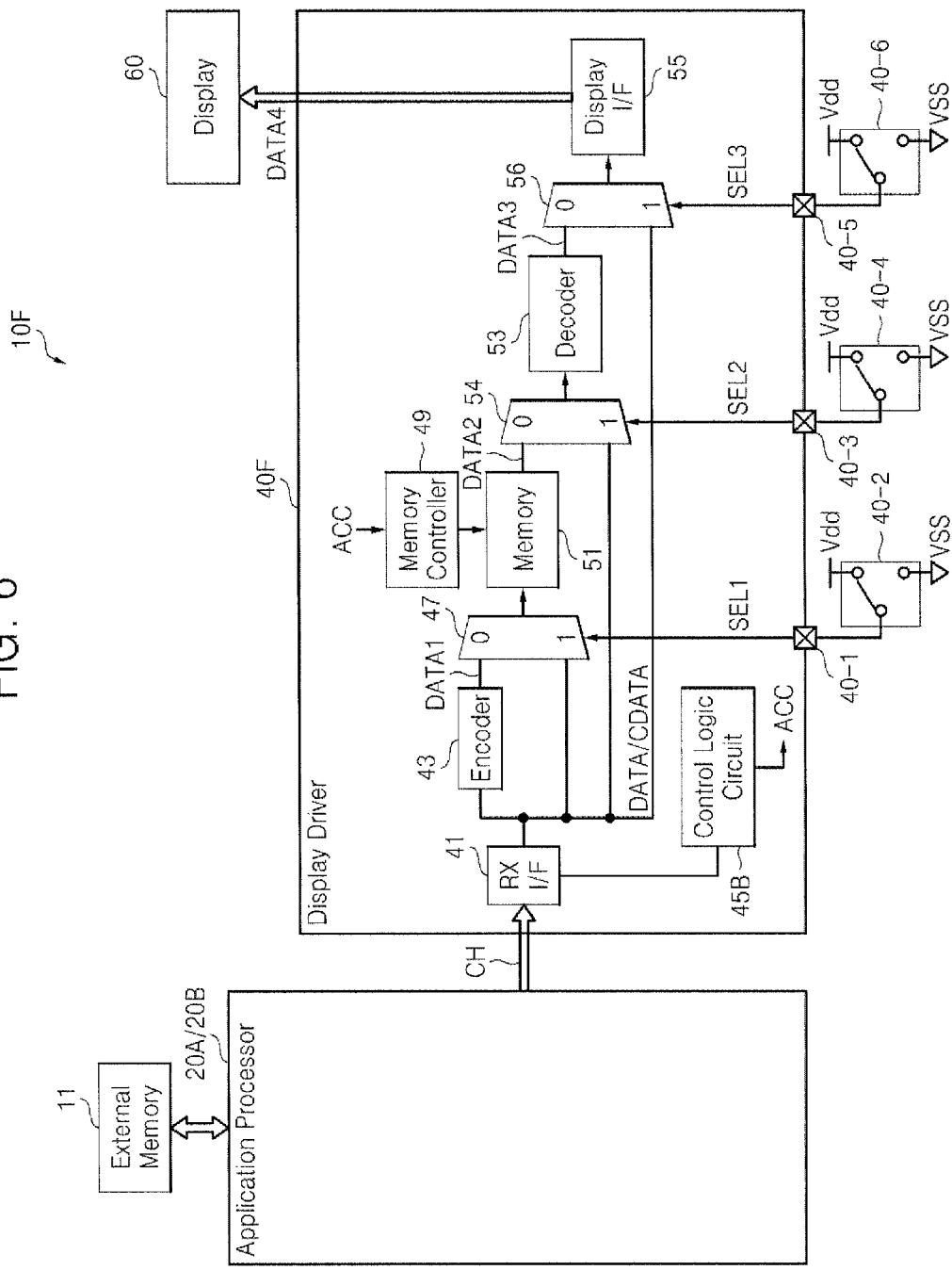

FIG. 6 is a block diagram of the image data processing system according to example embodiments. An image data processing system 10F includes the external memory 11, the application processor 20A or 20B, a display driver 40F and the display 60.

Except for a third external pin 40-5 and the third selection circuit 56, the display driver 40D of FIG. 4 has substantially the same structure as a display driver 40F of FIG. 6.

When the third external pin 40-5 is connected to a power supply line supplying power Vdd through a third switch 40-6, a third selection signal SEL3 is set to a second level. When the third external pin 40-5 is connected to a ground VSS through the third switch 40-6, the third selection signal SEL3 is set to a first level. Accordingly, the third selection circuit 56 outputs image data DATA3 output from the de-compressor 53 according to a third selection signal SEL3 having a first level, and the third selection circuit 56 outputs image data DATA or CDATA output from the receiving interface 41 according to a third selection signal SEL3 having a second level.

Figure 7:
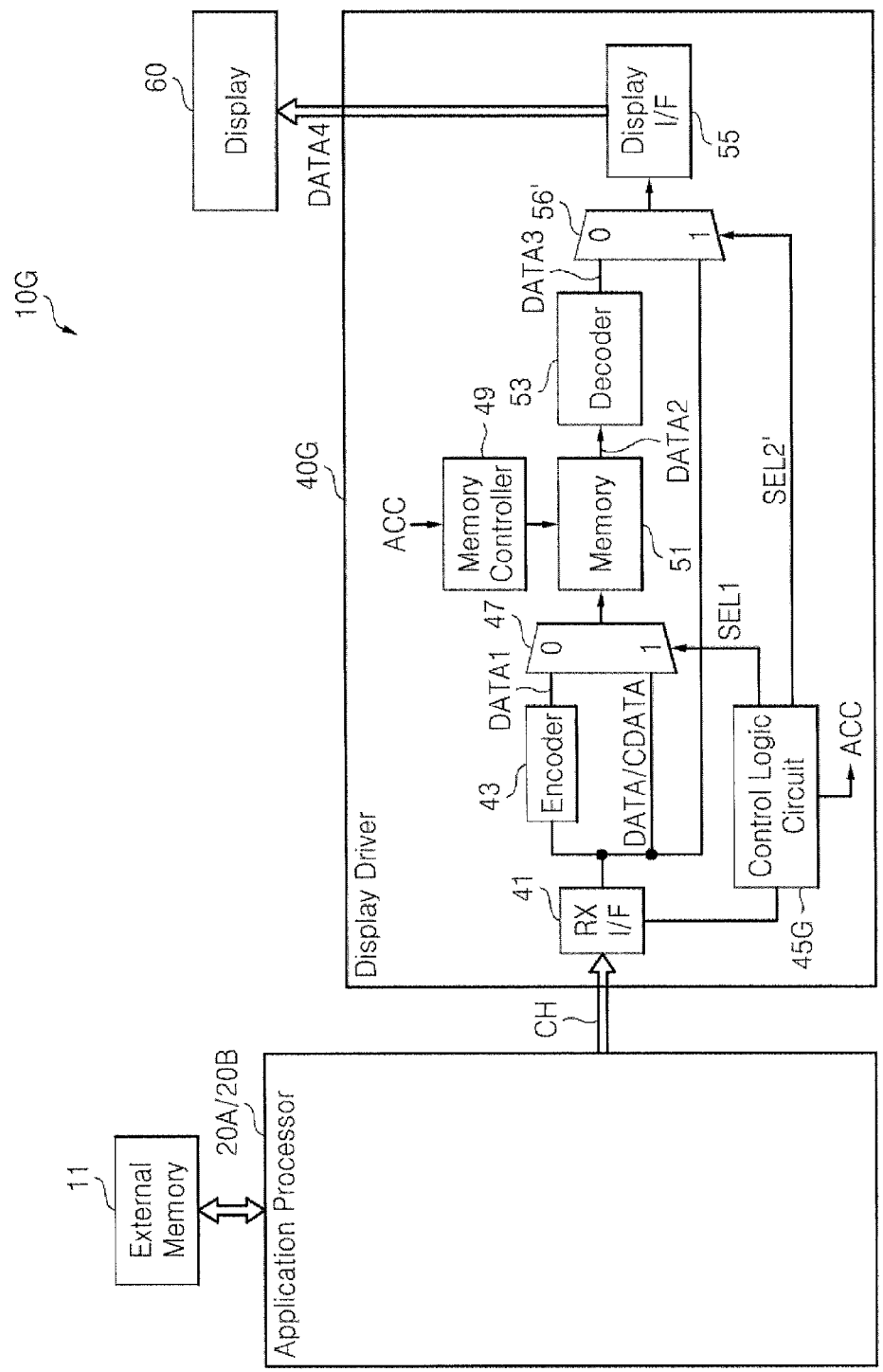

FIG. 7 is a block diagram of the image data processing system according to example embodiments. An image data processing system 10G includes the external memory 11, the application processor 20A or 20B, a display driver 40G and the display 60.

Except for a control logic circuit 45G and a second selection circuit 56', the display driver 40A of FIG. 1 has substantially the same structure as a display driver 40G of FIG. 7.

The control logic circuit 45G generates a first selection signal SEL1, a second selection signal SEL2' and an access control signal ACC according to control information included in image data DATA or CDATA output from the receiving interface 41.

According to a second selection signal SEL2', the second selection circuit 56' may transmit image data DATA3 output from the de-compressor 53 or image data DATA or CDATA output from the receiving interface 41 to the display interface 55.

For example, the second selection circuit 56' outputs image data DATA3 output from the de-compressor 53 according to a second selection signal SEL2' having a first level, and outputs image data DATA or CDATA output from the receiving interface 41 according to a second selection signal SEL2' having a second level.

Figure 8:
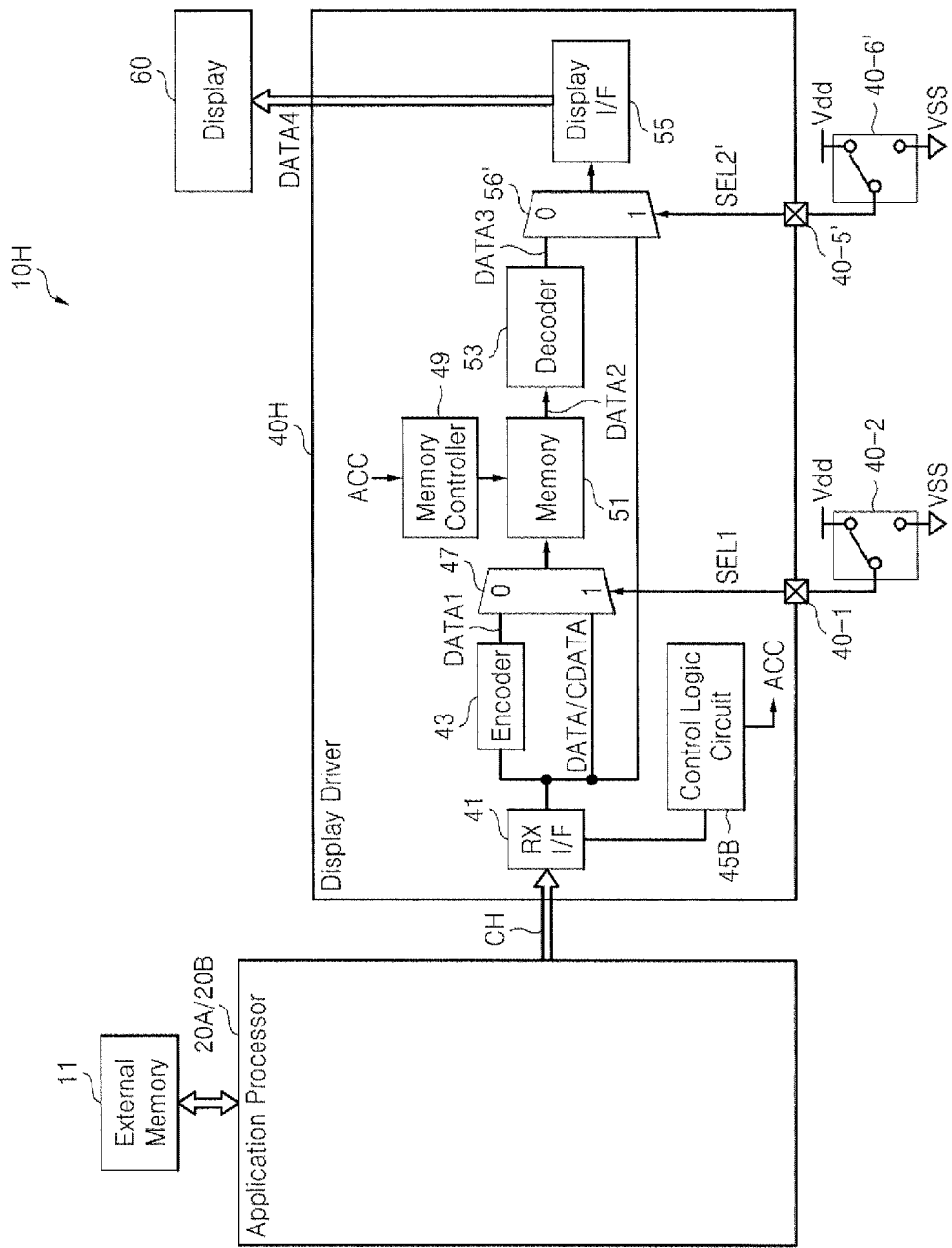

FIG. 8 is a block diagram of the image data processing system according to example embodiments. An image data processing system 10H includes the external memory 11, the application processor 20A or 20B, a display driver 40H and the display 60.

Except for a second external pin 40-5' and a second selection circuit 56', the display driver 40B of FIG. 2 has substantially the same structure as a display driver 40H of FIG. 8.

When the second external pin 40-5' is connected to a power supply line supplying power Vdd through a second switch 40-6', a second selection signal SEL2' is set to a second level. When the second external pin 40-5' is connected to a ground VSS through the second switch 40-6', the second selection signal SEL2' is set to a first level.

Accordingly, the second selection circuit 56' outputs image data DATA3 output from the de-compressor 53 according to a second selection signal SEL2' having a first level, and outputs image data DATA or CDATA output from the receiving interface 41 according to a second selection signal SEL2' having a second level.

In FIGS. 2, 4, 6 and 8, each switch 20-2, 40-2, 40-4, 40-6 or 40-6' is connected to each external pin 20-1, 40-1, 40-3, 40-5 or 40-5' as illustrated to set a level of each selection signal SELA, SEL1, SEL2, SEL3 or SEL2'. However, it will be understood that this is for illustration purposes only and that the level of a selection signal may be set by any other method that would be understood by one of ordinary skill.

Each switch 20-2, 40-2, 40-4, 40-6 or 40-6' may be replaced with, for example, a fuse, an anti-fuse or an e-fuse.

Additionally, a level of each selection signal SELA, SEL1, SEL2, SEL3 or SEL2' may be set by, for example, a manufacturer of a display driver (40A to 40H: collectively 40) and a mode register set (MRS) may be used as a means for setting each level of the selection signal SELA, SEL1, SEL2, SEL3 and SEL2'.

Figure 9:
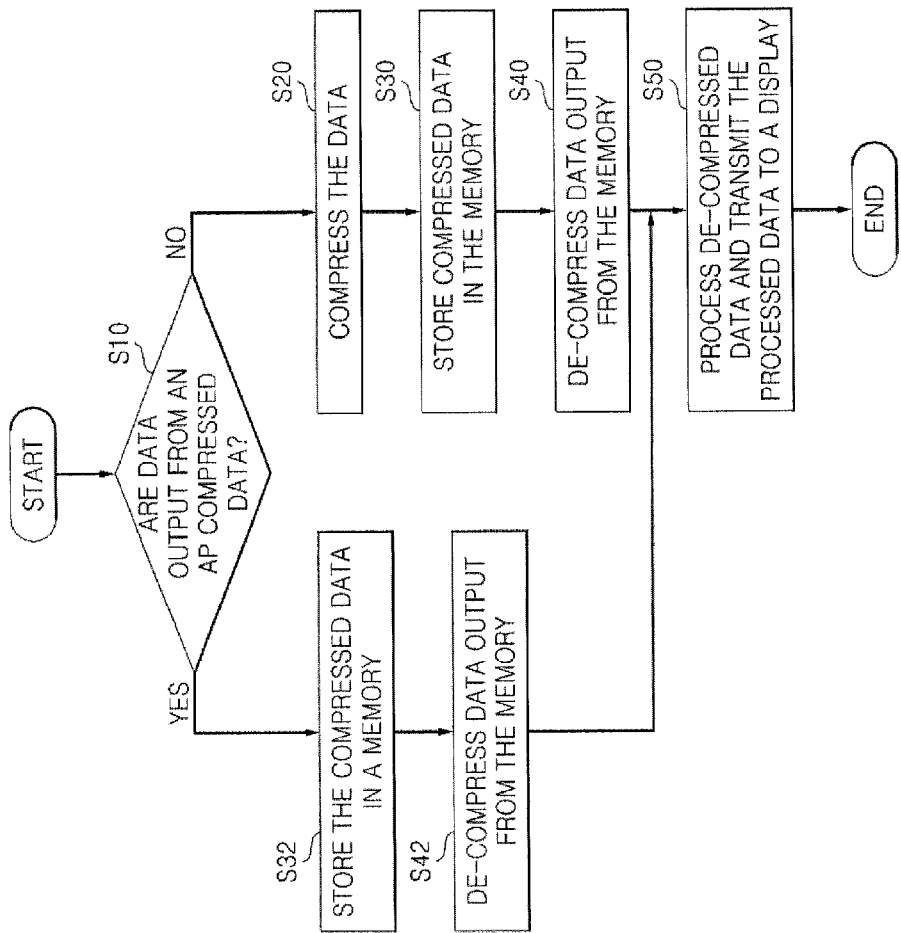
FIG. 9 is a flowchart for explaining an operation of the image data processing system illustrated in each of FIGS. 1 to 8.

FIG. 9 is a flowchart for explaining an operation of the image data processing system according to example embodiments illustrated in FIGS. 1 to 8. Referring to FIGS. 1 to 9, according to whether a level of each selection signal SELA, SEL1, SEL2, SEL3 or SEL2' is set to a specific level, e.g., a first level or a second level, a channel or data path may be set through which image data output by the application processor 20A or 20B are processed.

The level of each selection signal SELA, SEL1, SEL2, SEL3, or SEL2' may be set by a control logic circuit 45A, 45C, 45E or 45G, illustrated in FIG. 1, 3, 5 or 7, or the level of each selection signal SELA, SEL1, SEL2, SEL3, or SEL2' may be set by at least an external pin 40-1, 40-3, 40-5 or 40-5' as illustrated in FIG. 2, 4, 6 or 8.

When image data DATA output from the application processor (20A or 20B; collectively 20) are uncompressed image data, image data DATA output from the receiving interface 41 are compressed by the compressor 43 (S20) and compressed image data DATA1 are stored in the memory 51 (S30).

The de-compressor 53 de-compresses image data DATA2 output from the memory 51 (S40). The display interface 55 processes de-compressed image data DATA3 and transmits processed image data DATA4 to the display 60 (S50). However, when image data CDATA output from the application processor 20 are already compressed image data, compressed image data CDATA output from the receiving interface 41 are stored in the memory 51 through the first selection circuit 47 (S32).

The de-compressor 53 de-compresses image data DATA2 output from the memory 51 (S42). The display interface 55 processes de-compressed image data DATA3 and transmits processed image data DATA4 to the display 60 (S50).

Figure 10:
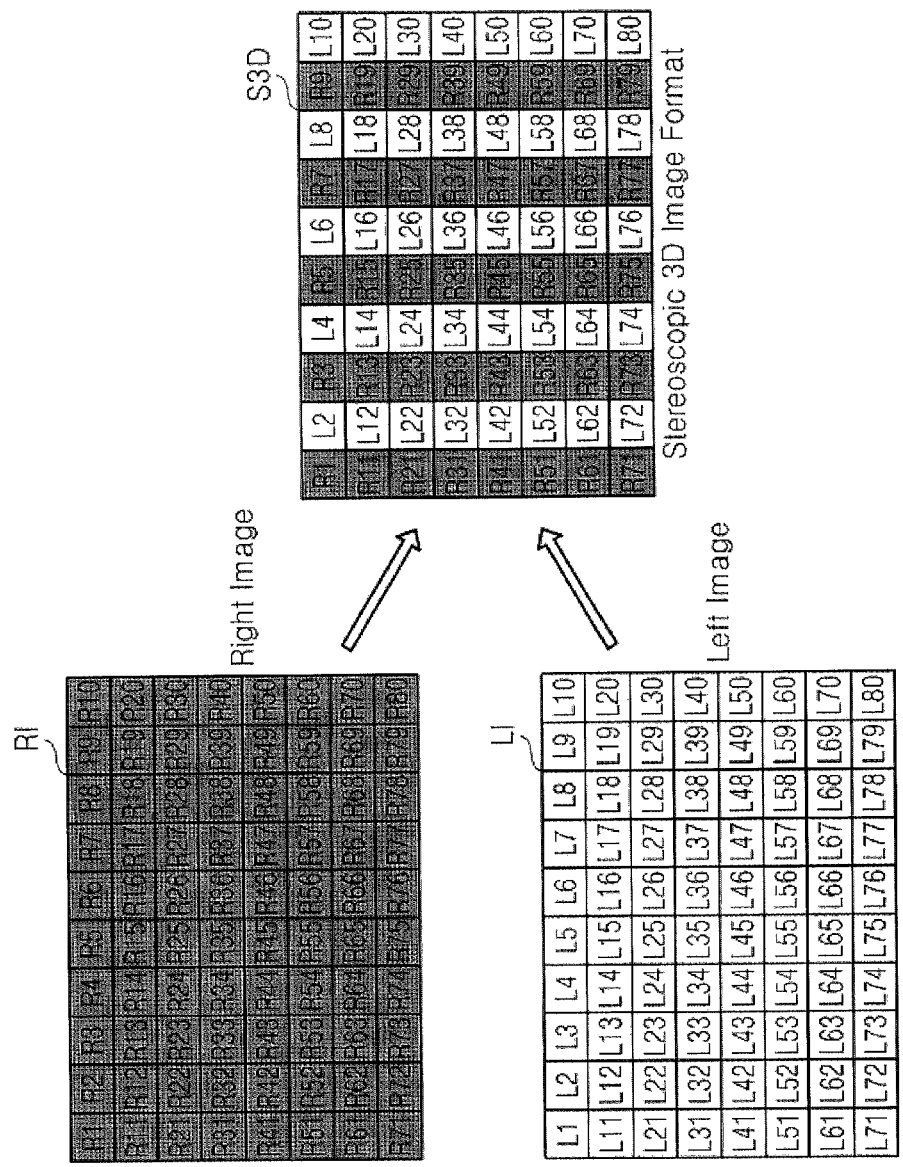
FIG. 10 is a conceptual diagram for explaining a format of general stereoscopic 3D image data.

FIG. 10 is a conceptual diagram for explaining a format of general stereoscopic 3D image data. Referring to FIG. 10, a conventional stereoscopic 3D image data format S3D includes odd-numbered vertical pixel data of right image data RI and even-numbered vertical pixel data of left image data LI, or the conventional stereoscopic 3D image data format S3D includes even-numbered vertical pixel data of right image data RI and odd-numbered vertical pixel data of left image data LI. That is, the conventional stereoscopic 3D image data format S3D has left pixel data and right pixel data alternately arranged vertically line-by-line.

The conventional stereoscopic 3D image data format S3D includes half of the right image data RI and half of the left image data RI, so that image-quality deterioration may occur. Moreover, a display displaying stereoscopic 3D image data, i.e., a parallax barrier included in a stereoscopic 3D image panel, is fixed, so that a horizontal stripe may be seen in the stereoscopic 3D image panel. For example, when resolution of each image data RI or LI is a wide extended graphics array (WXGA), resolution of the stereoscopic 3D image data format S3D may be WXGA.

Figure 11:
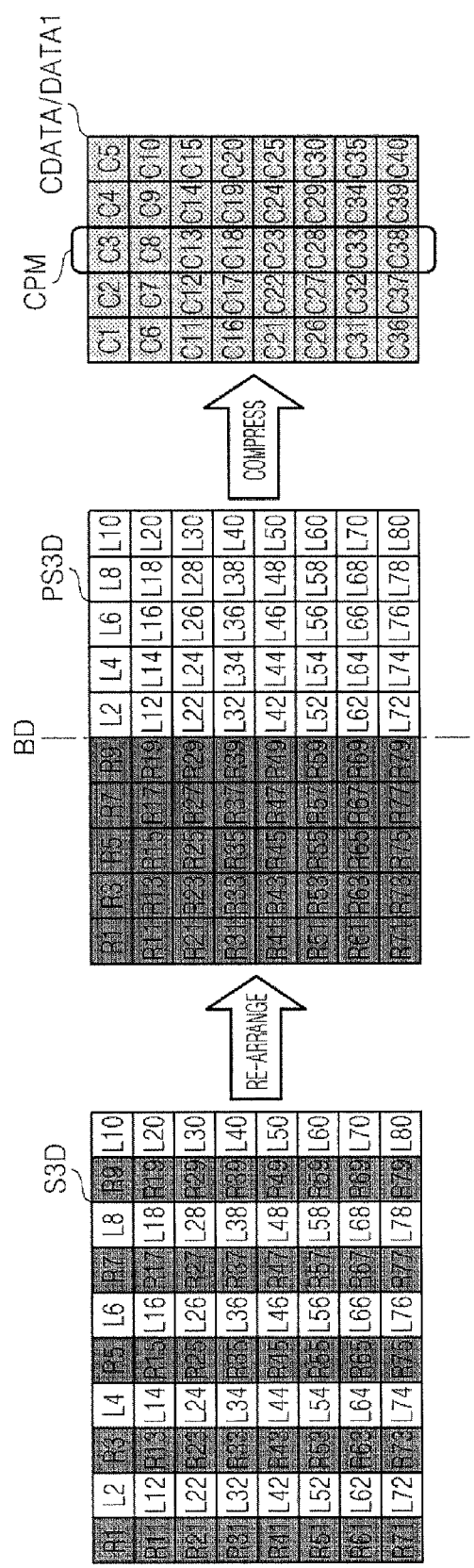
FIG. 11 is a conceptual diagram for explaining a format and compression of stereoscopic 3D image data according to example embodiments.

FIG. 11 is a conceptual diagram for explaining a format and compression of stereoscopic 3D image data according to example embodiments. Referring to FIG. 11, in contrast to the conventional stereoscopic 3D image data format S3D, a re-arranged stereoscopic 3D image data format PS3D includes a left frame including only left pixel data and a right frame including only right pixel. The left frame and the right frame are arranged adjacent to each other. Accordingly, cross-talk which may be generated in the display 60 may be reduced or prevented.

Each compressor 33 or 43 illustrated in FIGS. 1 to 8 may generate a compressed stereoscopic 3D image data format CDATA or DATA1 by compressing the re-arranged stereoscopic 3D image data format PS3D. For example, compressed stereoscopic 3D image data C1, which are included in the compressed stereoscopic 3D image data format CDATA or DATA1, include only right pixel data R1, R3, R11 and R13. Compressed stereoscopic 3D image data C3 include right pixel data R9 and R19 and left pixel data L2 and L12.

To prevent cross-talk that may have a visible effect on the data, the display driver 40 illustrated in FIGS. 1 to 8 may not process compressed stereoscopic 3D image data CPM that includes pixel data located on a boundary line BD between a left frame and a right frame.

Figure 12:
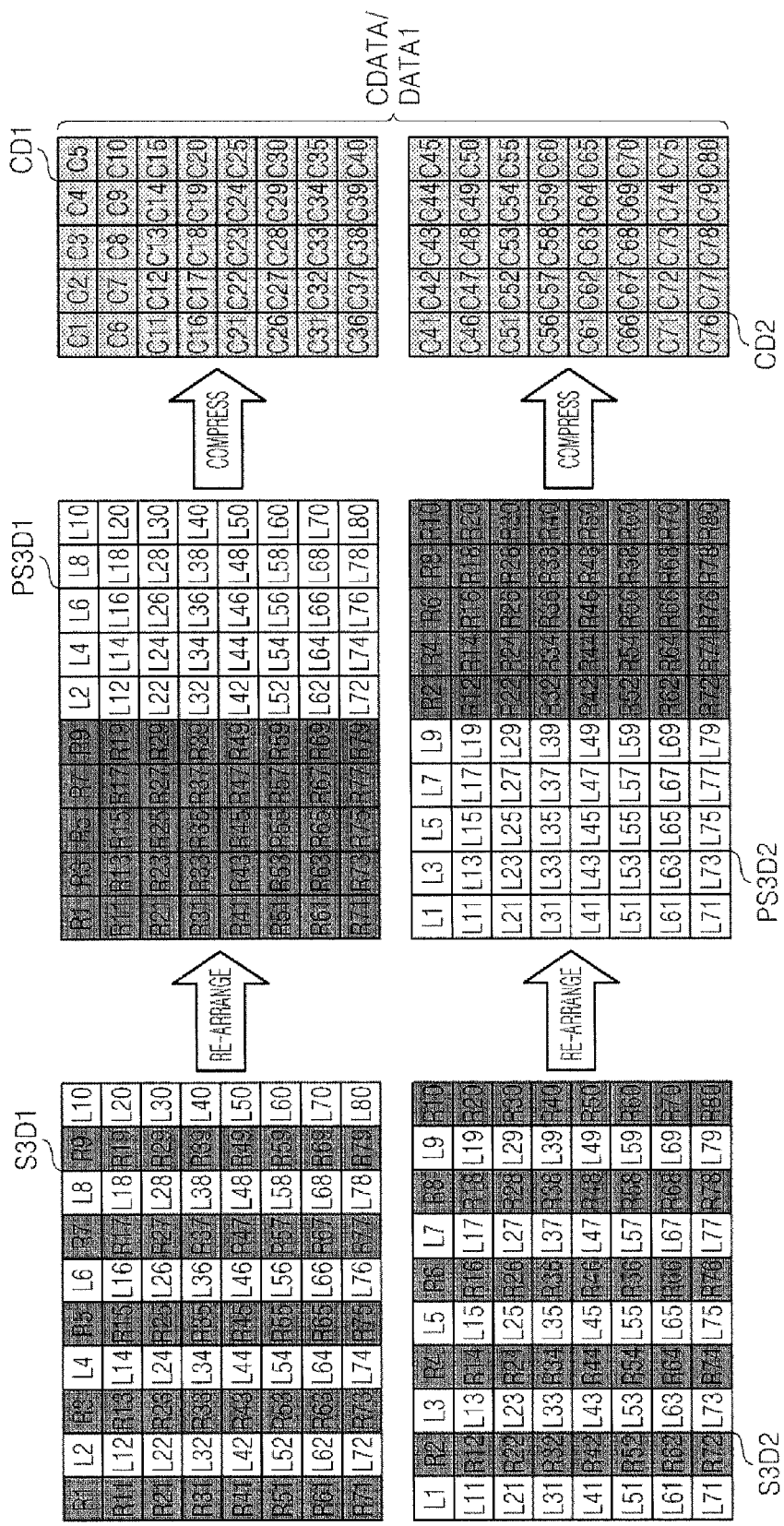
FIG. 12 is a conceptual diagram for explaining a compressor of the display controller illustrated in each of FIGS. 1 to 8 or an operation thereof.

FIG. 12 is a conceptual diagram for explaining a compressor of the display controller illustrated in each of FIGS. 1 to 8 or an operation thereof. FIG. 12 illustrates a stereoscopic image data format for displaying full resolution stereoscopic image data, and each of S3D1 and S3D2 includes pixel data corresponding to half of full resolution.

When the application processor 20 outputs compressed stereoscopic image data CDATA, an operation of the compressor 33 of the display controller 30 according to example embodiments is as follows.

The compressor 33 generates re-arranged first stereoscopic image data PS3D1 by re-arranging first stereoscopic image data S3D1 output from the image processing logic circuit 31. The compressor 33 generates compressed stereoscopic image data CD1 by compressing the re-arranged first stereoscopic image data PS3D1. The re-arranged first stereoscopic image data PS3D1 include a right frame including only right pixel data and a left frame including only left pixel data.

The compressor 33 generates re-arranged second stereoscopic image data PS3D2 by re-arranging second stereoscopic image data S3D2 output from the image processing logic circuit 31 and generates compressed second stereoscopic image data CD2 by compressing the re-arranged second stereoscopic image data PS3D2. The re-arranged second stereoscopic image data PS3D2 includes a right frame including only right pixel data and a left frame including only left pixel data.

When the compressor 43 of the display driver 40 outputs compressed data DATA1 by compressing uncompressed data DATA, an operation of the compressor 43 of the display driver 40 is as follows.

The compressor 43 generates re-arranged first stereoscopic image data PS3D1 by re-arranging first stereoscopic image data S3D1 output through the receiving interface 41 and the compressor 43 generates compressed first stereoscopic image data CD1 by compressing the re-arranged first stereoscopic image data PS3D1. In addition, the compressor 43 generates re-arranged second stereoscopic image data PS3D2 by re-arranging second stereoscopic image data S3D2 output through the receiving interface 41 and the compressor 43 generates compressed second stereoscopic image data CD2 by compressing the re-arranged second stereoscopic image data PS3D2.

Figure 13:
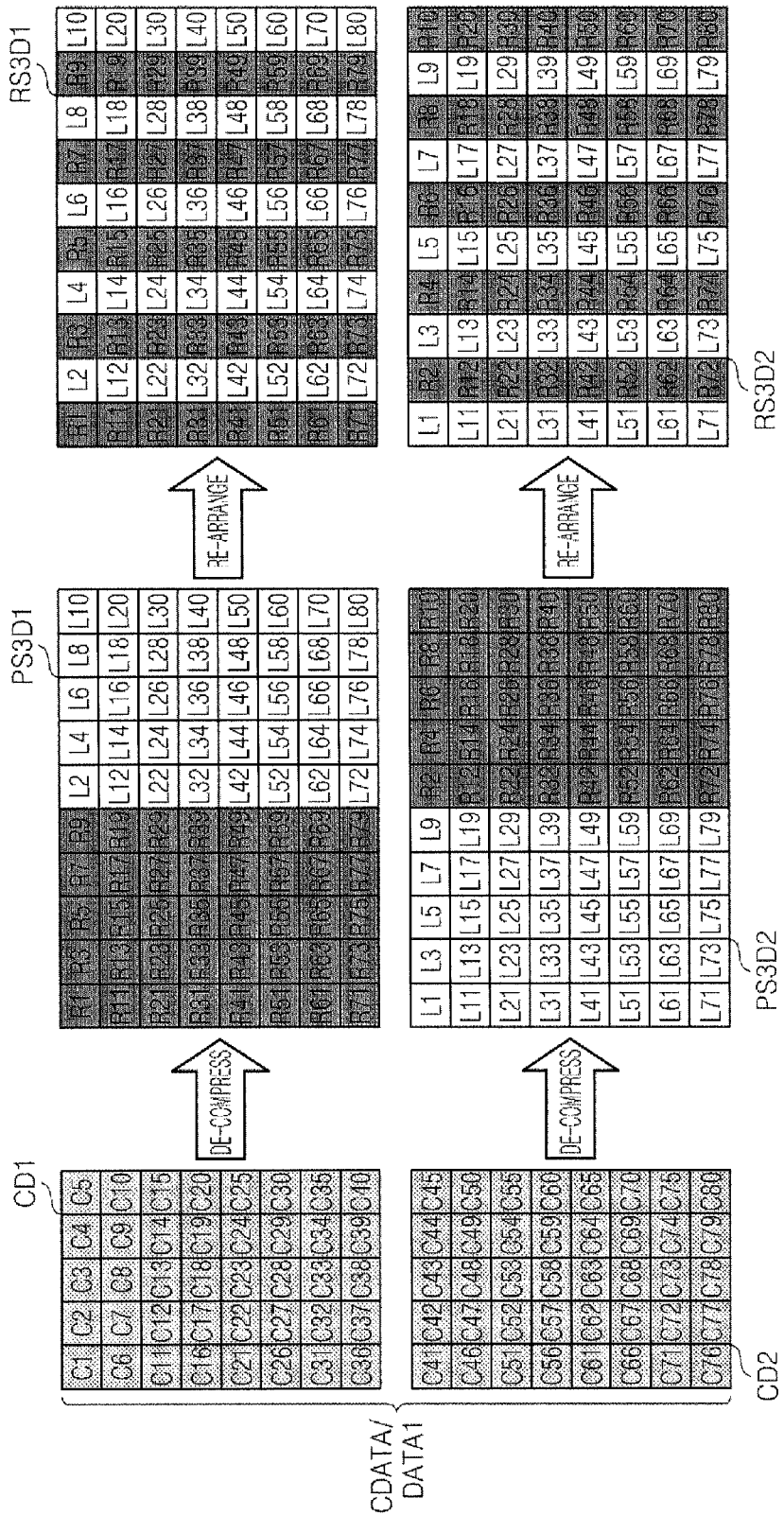
FIG. 13 is a conceptual diagram for explaining an operation of a de-compressor of the display driver illustrated in each of FIGS. 1 to 8.

FIG. 13 is a conceptual diagram for explaining an operation of a de-compressor of the display driver in example embodiments illustrated in FIGS. 1 to 8. The de-compressor 53 of the display driver 40 generates re-arranged first stereoscopic image data PS3D1 by de-compressing compressed first stereoscopic image data CD1 and the de-compressor 53 generates restored first stereoscopic image data RS3D1 by re-arranging the re-arranged first stereoscopic image data PS3D1.

In addition, the de-compressor 53 of the display driver 40 generates re-arranged second stereoscopic image data PS3D2 by de-compressing compressed second stereoscopic image data CD2 and the de-compressor 53 generates restored second stereoscopic image data RS3D2 by re-arranging the re-arranged second stereoscopic image data PS3D2.

Figure 14:
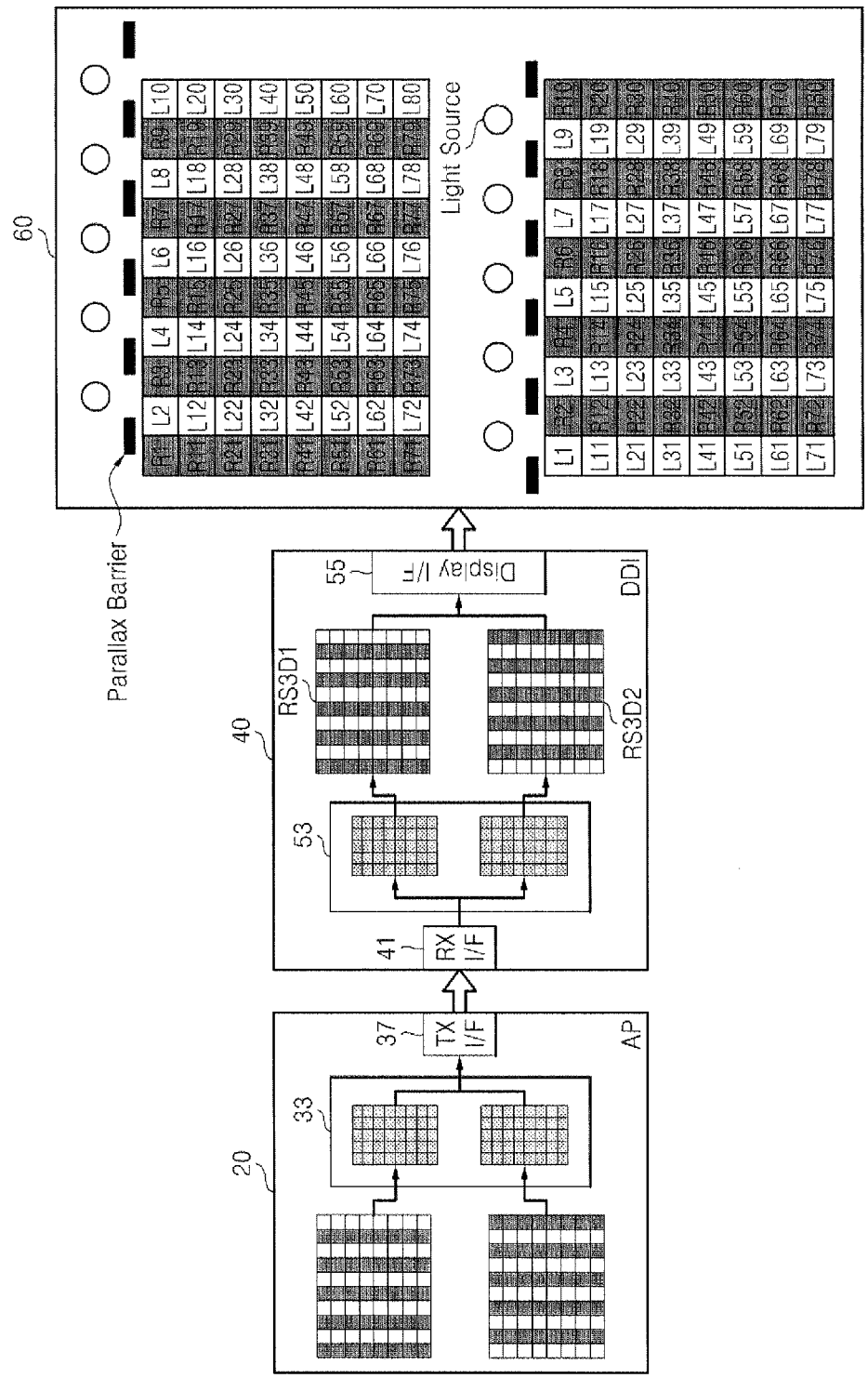
FIG. 14 is a conceptual diagram for explaining an operation where the image data processing system illustrated in each of FIGS. 1 to 8 processes stereoscopic 3D image data.

FIG. 14 is a conceptual diagram for explaining an operation in which the image data processing system in example embodiments illustrated in FIGS. 1 to 8 processes stereoscopic 3D image data.

The compressor 33 of the display controller 30 transmits compressed stereoscopic image data to the display driver 40, the de-compressor 53 of the display driver 40 de-compresses compressed stereoscopic image data, and the display 60 displays de-compressed stereoscopic image data output from the display driver 40.

The display 60 includes a plurality of light sources and a plurality of parallax barriers. Each location of the plurality of parallax barriers included in the display 60, which may display full-resolution stereoscopic 3D image data, may change to alternately display the right image and the left image.

While a conventional display displays half-resolution image at 60 Hz, the display 60 of example embodiments may display full-resolution image at 120 Hz.

Figure 15:
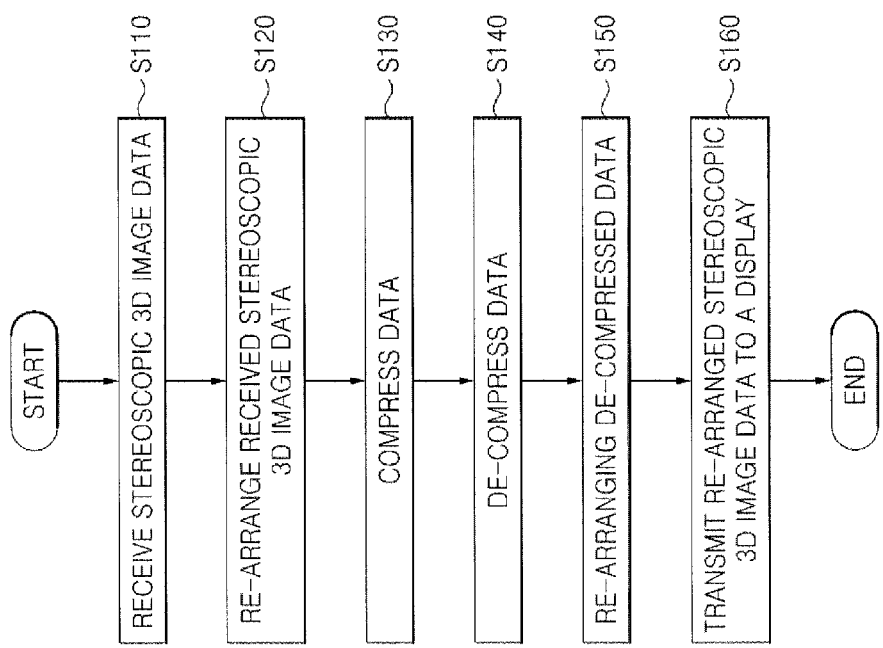
FIG. 15 is a flowchart for explaining a process where the image data processing system illustrated in each of FIGS. 1 to 8 processes stereoscopic 3D image data.

FIG. 15 is a flow chart for explaining a process in which the image data processing system of example embodiments illustrated in FIGS. 1 to 8 processes stereoscopic 3D image data. Referring to FIGS. 11 to 15, the compressor 33 of the application processor 20 receives stereoscopic 3D image data S3D1 and S3D2 (S110), re-arranges received stereoscopic 3D image data S3D1 and S3D2 to have a format as illustrated in FIG. 12 (S120), compresses re-arranged stereoscopic 3D image data PS3D1 and PS3D2, and transmits compressed stereoscopic 3D image data CDATA1 and CDATA2 to the display driver 40 through the transmission interface 37 and a channel CH.

However, when stereoscopic 3D image data output from the application processor 20 are uncompressed image data, the compressor 43 of the display driver 40 may receive stereoscopic 3D image data S3D1 and S3D2 output from the receiving interface 41 (S110), re-arrange received stereoscopic 3D image data S3D1 and S3D2 to have a format as illustrated in FIG. 12 (S120), compress re-arranged stereoscopic 3D image data PS3D1 and PS3D2, and transmit compressed stereoscopic 3D image data CDATA1 and CDATA2 to the memory 51 through the first selection circuit 47.

That is, steps S110 to S130 may be performed by the compressor 33 of the application processor 20 or the compressor 43 of the display driver 40.

The de-compressor 53 of the display driver 40 receives compressed stereoscopic 3D image data DATA2 output from the memory 51 or compressed stereoscopic 3D image data CDATA from the second selection circuit 54, de-compresses compressed stereoscopic 3D image data CDATA in the same manner as discussed above with regard to FIG. 13 (S140), re-arranges de-compressed stereoscopic 3D image data (S150), and transmits re-arranged stereoscopic 3D image data to the display 60 (S160).

Figure 16:
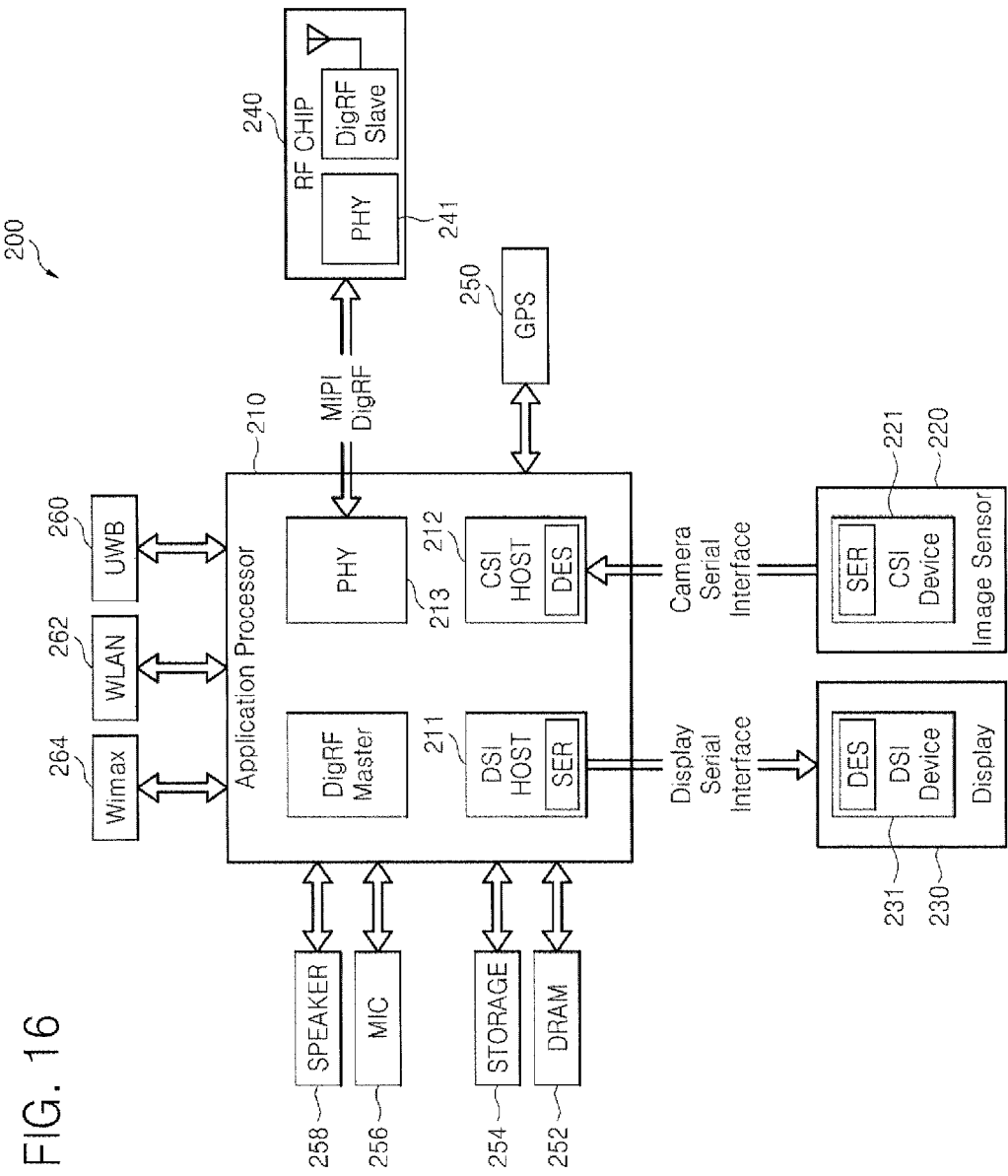
FIG. 16 is a block diagram of the image data processing system according to example embodiments.

FIG. 16 is a block diagram of the image data processing system according to at least one example embodiment. The image data processing system 200 of FIG. 16 may be a device using or supporting a mobile industry processor interface (MIPI®), e.g., a mobile phone, a smart phone or a tablet personal computer.

The image data processing system 200 includes an application processor 210, an image sensor 220 and a display 230. The application processor 210 may include the display controller 30A or 30B illustrated in FIG. 1 or 2.

A camera serial interface (CSI) host 212 embodied in the application processor 210 may perform a serial communication with a CSI device 221 of the image sensor 220 through a camera serial interface (CSI). According to an example embodiment, a de-serializer DES may be embodied in the CSI host 212 and a serializer SER may be embodied in the CSI device 221.

A display serial interface (DSI) host 211 of the application processor 210 may perform a serial communication with a DSI device 231 of the display 230 through a display serial interface. According to example embodiments, the DSI host 211 may include a serializer SER and the DSI device 231 may include a de-serializer DES. The DSI host 211 or the DSI device 231 may include one of display drivers 40A to 40H in example embodiments illustrated in FIGS. 1 to 8.

The image data processing system 200 may further include an RF chip 240 that may communicate with the application processor 210. A PHY 213 of the application processor 210 and a PHY 241 of a RF chip 240 may transmit or receive data according to MIPI DigRF.

The application processor 210 may further include a GPS receiver 250, a volatile memory 252 such as a dynamic random access memory (DRAM), a data storage device 254 including a non-volatile memory device such as a NAND flash memory, a microphone 256 or a speaker 258. Moreover, the application processor 210 may communicate with an external device by using at least a communication protocol or a communication standard, e.g., ultra-wideband (UWB) 260, Wireless LAN (WLAN) 262, worldwide interoperability for microwave access (WiMAX) 264 or long-term evolution (LTE™).

An application processor according to example embodiments, to reduce transmission amount of image data, may compress the image data and transmit compressed image data at high speed. Power consumed in the application processor, which may transmit compressed image data, may be reduced. The application processor may also reduce a size of a frame memory embodied in a display driver that may process compressed image data.

An application processor, which may re-arrange stereoscopic 3D image data, compress re-arranged stereoscopic 3D image data and transmit compressed stereoscopic 3D image data, may reduce the amount of data transmitted to a display driver. The display driver, which may process re-arranged stereoscopic 3D image data, may display full resolution image to a display while also reducing cross-talk.

While example embodiments have been particularly shown and described, it will be understood by those of ordinary skill in the art that various changes in form and detail may be made therein without departing from the spirit and scope of the example embodiments as defined by the following claims.

What is claimed is:

1. A display driver comprising:
a compressor configured to output first data by compressing input data to reduce size of the input data;
a first selection circuit configured to transmit the input data or the first data to a memory in response to a first selection signal;
a de-compressor configured to output second data by de-compressing third data output from the memory to restore the third data;
a display interface configured to process the second data and create fourth data for transmitting to a display;
a second selection circuit configured to transmit the input data or the third data to the decompressor based on a second selection signal;
a first pin configured to receive the first selection signal; and
a second pin configured to receive the second selection signal.

2. The display driver of claim 1, further comprising:
a control logic circuit configured to generate the first selection signal based on information indicating whether to compress the input data.

3. The display driver of claim 1, further comprising:
a control logic circuit configured to generate the first selection signal and the second selection signal based on the input data.

4. The display driver of claim 1, further comprising:
the second selection circuit configured to transmit the input data or the second data to the display interface based on a second selection signal.

5. The display driver of claim 1, wherein, when the input data are stereoscopic 3D image data in which right and left data are alternately arranged vertically line by line, the compressor generates the first data by re-arranging the stereoscopic 3D image data and compressing re-arranged stereoscopic 3D image data, and
the re-arranged stereoscopic 3D image data include a left frame and a right frame, the left frame including only left pixel data, the right frame including only right pixel data and being arranged adjacent to the left frame.

6. The display driver of claim 1, wherein, when the third data are re-arranged and compressed stereoscopic 3D image data, and the de-compressor de-compresses and re-arranges the de-compressed stereoscopic 3D image data to generate and output the second data,
the de-compressed and re-arranged stereoscopic 3D image data include a left frame and a right frame, the left frame including only left pixel data, and the right frame including only right pixel data and being arranged adjacent to the left frame, and
the second data are stereoscopic 3D image data where right and left pixel data are alternately arranged vertically line by line.

7. A display driver comprising:
a compressor configured to output first data by compressing input data to reduce size of the input data;
a first selection circuit configured to transmit the input data or the first data to a memory in response to a first selection signal;
a de-compressor configured to output second data by de-compressing third data output from the memory to restore the third data;
a display interface configured to process the second data and create fourth data for transmitting to a display;
a second selection circuit configured to transmit the input data or the third data to the de-compressor based on a second selection signal;
a third selection circuit configured to transmit the input data or the second data to the display interface based on a third selection signal; and
a control logic circuit configured to generate the first selection signal, the second selection signal and the third selection signal based on the input data.

8. A display driver comprising:
a compressor configured to output first data by compressing input data to reduce size of the input data;

a first selection circuit configured to transmit the input data or the first data to a memory in response to a first selection signal;
a de-compressor configured to output second data by de-compressing third data output from the memory to restore the third data;
a display interface configured to process the second data and create fourth data for transmitting to a display;
a second selection circuit configured to transmit the input data or the third data to the de-compressor based on a second selection signal;
a third selection circuit configured to transmit the input data or the second data to the display interface based on a third selection signal;
a first pin configured to receive the first selection signal;
a second pin configured to receive the second selection signal; and
a third pin configured to receive the third selection signal.

* * * * *